UNITED STATES PATENT OFFICE.

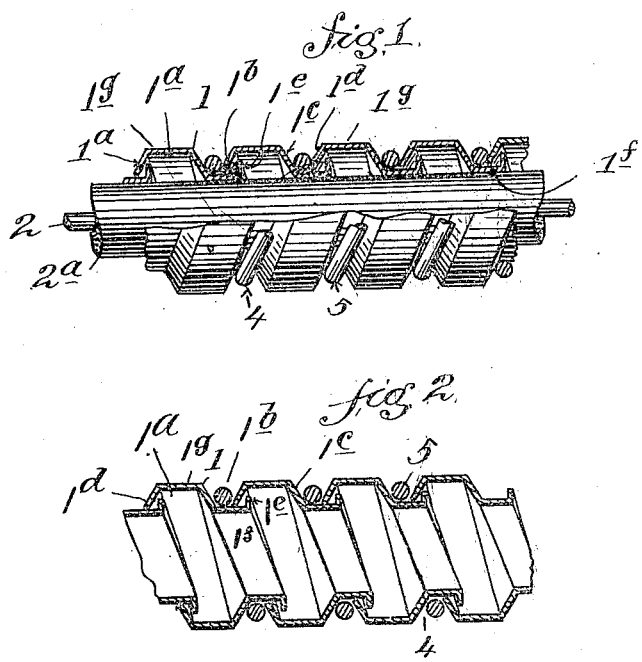

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

ARMORED CONDUIT OR CONDUCTOR.

1,095,648.  Specification of Letters Patent.  Patented May 5, 1914.

Application filed July 22, 1910. Serial No. 573,183.

*To all whom it may concern:*

Be it known that I, GEORGE A. LUTZ, a citizen of the United States, and resident of Plainfield, in the county of Union and State of New Jersey, have invented certain new and useful Improvements in Armored Conduits or Conductors, of which the following is a specification.

The object of my invention is to provide a protecting armor or covering for electric conductors, and for other purposes, and to cause the convolutions of the spirally wound protecting armor or covering to retain their proper relative positions whether the device be straight or curved.

In carrying out my invention I provide a spirally wound covering or armor, the material of which is provided with longitudinally disposed grooves side by side but facing in opposite directions, the marginal projecting portion of one convolution entering the groove of the adjacent convolution, and within the outwardly disposed spiral groove of the convolutions I wind a wire or the like which is adapted to engage an intermediate wall of one convolution and a marginal edge portion of the adjacent convolution, whereby said convolutions are maintained separated, whereby when the device is bent or curved the outer portion of the convolutions may separate to some extent, while the inner portions thereof are maintained in a substantially normal position to prevent the convolutions from crowding and enabling the ready curving or bending of the device.

Reference is to be had to the accompanying drawings forming part hereof, wherein, Figure 1 is a partly sectional side view of an armored conductor embodying my invention; and Fig. 2 is a central section of the armor or conduit, the conductor being removed.

In forming my improvements I provide a strip of suitable material 1, such as metal, with inner and outer longitudinal grooves $1^a$, $1^b$, thereby providing in the strip an intermediate wall $1^c$, and an inwardly turned marginal portion $1^d$ and an outwardly turned marginal portion $1^e$. In Figs. 1 and 2 the intermediate web portion $1^c$ is inclined at an angle to the base portion $1^f$, which is shown flat to bear upon the insulation $2^a$ of conductor 2, and the inturned marginal portion $1^d$ is at an angle to the adjacent outer flat portion $1^g$ of the winding, the parts $1^c$, $1^d$ extending at an oblique angle to each other. When the strip is wound the inturned angular portions $1^d$ will enter the grooved portion $1^b$ while the outer turned portion $1^e$ will enter the grooved portion $1^a$, and the parts will be prevented from becoming separated in the direction of the length of the conductor 2. The arrangement provides an external spirally disposed space 4 between the parts $1^e$ and $1^b$ within which I wind a wire or the like 5 in a spiral manner, which partially fills said space. The wire 5 is thus interposed between the parts $1^e$, $1^d$ of the spiral winding and acts as an abutment between said parts $1^e$, $1^d$ to resist contraction or pushing together of the spiral winding, yet permits the device to be bent or curved, as the outer portion of the spiral winding may be separated somewhat while the wire 5 serves to prevent the parts $1^e$, and $1^d$ on the inner side of the curve from approaching too closely. By having the parts $1^e$, $1^d$ at an angle to the plane of conductor 2 they may crowd somewhat under winding 5 if necessary on the inner portion of the groove, thereby tending to tighten the binding upon the spiral winding.

Having now described my invention what I claim is:—

A device of the character described comprising a protecting spiral strip having outwardly and inwardly disposed grooved portions and projecting marginal portions, the marginal portion of one convolution extending at an angle to the plane of the winding and overlapping the marginal portion of the adjacent convolution, an intermediate wall of said winding being located at an angle to said angular marginal portion providing a V-shaped exterior spiral groove therebetween, the angular marginal portion of one convolution being over and spaced freely from the adjacent margin of another convolution, and a spirally disposed wire within said V-shaped groove and interposed between said angular portions and free to move when pressed by the said angular marginal portion during bending of the device.

Signed at New York city, in the county of New York and State of New York this 19th day of July, A. D. 1910.

GEORGE A. LUTZ.

Witnesses:
T. F. BOURNE,
MARIE F. WAINRIGHT.